(12) United States Patent
Kumano et al.

(10) Patent No.: US 6,649,260 B2
(45) Date of Patent: Nov. 18, 2003

(54) OPTICAL COATING FILM

(75) Inventors: Katsufumi Kumano, Tsuruga (JP); Naonobu Oda, Inuyama (JP); Akira Ito, Tsuruga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 15 days.

(21) Appl. No.: 10/003,382

(22) Filed: Dec. 6, 2001

(65) Prior Publication Data

US 2002/0106506 A1 Aug. 8, 2002

(30) Foreign Application Priority Data

Dec. 8, 2000 (JP) ........................................ 2000-374862
Dec. 28, 2000 (JP) ........................................ 2000-402485

(51) Int. Cl.$^7$ ................................................. B32B 7/12
(52) U.S. Cl. ................................ 428/343; 428/355 AC; 428/355 N; 428/423.7; 428/480; 428/483
(58) Field of Search ........................... 428/343, 355 AC, 428/355 N, 423.7, 480, 483

(56) References Cited

FOREIGN PATENT DOCUMENTS

| EP | 0 962 484 | 12/1999 |
|----|-----------|---------|
| JP | 1-88661 | 6/1989 |
| JP | 07-216201 | 8/1995 |
| JP | 09-156246 | 6/1997 |
| JP | 09-183201 | 7/1997 |
| JP | 09-204006 | 8/1997 |
| JP | 09-300549 | 11/1997 |
| JP | 10-036494 | 2/1998 |
| JP | 10-138405 | 5/1998 |
| JP | 10-166519 | 6/1998 |
| JP | 11-005834 | 1/1999 |
| JP | 11-323271 | 11/1999 |
| JP | 2000-233442 | 8/2000 |
| JP | 2000-238221 | 9/2000 |
| JP | 2000-2382222 | 9/2000 |

*Primary Examiner*—James J. Seidleck
*Assistant Examiner*—Melanie Bissett
(74) *Attorney, Agent, or Firm*—Foley & Lardner

(57) ABSTRACT

An optical coating film in accordance with the present invention makes it possible to prevent the generation of scratches having a size of a specific size or more, thus, since it becomes possible to reduce optical defects caused by the scratches, the optical coating film is suitably applicable to a base film for a prism sheet, an anti-reflection sheet and a hard coating film used for liquid crystal display, a base film for a near infrared ray absorbing film used for a front panel of a plasma display, a base film for a transparent conductive film used for touch panels and electro-luminescence or an anti-destruction film for cathode ray tube.

11 Claims, No Drawings

OPTICAL COATING FILM

BACKGROUND OF THE INVENTION

1. Field of the Invention

The present invention relates to an optical coating film using a biaxial oriented thermoplastic resin film as a base film.

2. Description of the Background Art

Biaxial oriented thermoplastic resin films made from polyester or the like have been widely used as various optical films that are applied with light being transmitted or reflected, because of their superior transparency, dimension stability and chemical resistance. In particular, with respect to the applications such as base films for prism lens sheet and base films for hard coating film, used for liquid crystal displays (LCDs), base films for anti-reflection (AR) film, base films for diffusion plate, anti-destruction films for cathode ray tube (CRT), transparent conductive films used for touch panel and electro-luminescence, and near-infrared-ray absorbing films and electromagnetic wave absorbing films used for front panel of plasma display, comparatively thick films are used since superior strength and dimension stability are required.

Such optical films are required to have superior transparency and to exert a superior adhesive property to other films when they are subjected to a prism lens process, a hard coating process or an AR process, and the films are further desired to be less susceptible to optical defects therein.

Normally, in order to improve its handling properties (sliding property, winding property, anti-blocking property, etc.) and scratch resistant property of a film, processes for allowing the film to contain particles and for forming irregularities on the surface thereof have been generally carried out. However, in general, the transparency of the film tends to decrease due to the great difference in refractive indexes between the particles and polyester and voids generated on the periphery of each particle at the time of film orientation.

Therefore, when the content of particles in the base film is reduced for the purpose of obtaining a highly transparent film, the optical defects become more apparent while the transparency is improved.

In particular, generally, conventional biaxial oriented polyester films are inferior in adhesive property with respect to other materials, such as prism lens layers and hard coating layers mainly made from acrylic resins.

Moreover, scratches on the surface of the base film form one of reasons of optical defects in the film. In the case when there are fine scratches on the surface of a base film, if this is formed in, for example, a lens sheet, the scratches on the surface of the base film might be enlarged by a lens layer or cause optical defects on the display portion in a liquid crystal display.

With respect to a technique for suppressing the occurrence of these scratches, Japanese Unexamined Patent Publication No. 9-183201 (1997) discloses a polyester optical film in which a surface active agent is provided on the film surface so that scratches being 20 mm or more in length and 0.5 μm or more in the maximum depth are reduced to 10 pcs/m² or less. However, this technique fails to suppress the occurrence of more finer scratches, failing to satisfy the level of quality that has been required for the recent optical films.

The present invention has been devised to solve the above-mentioned problems, and its principle object is to provide an optical coating film that is less susceptible to optical defects. Furthermore, another object is to provide an optical coating film that is superior in transparency and adhesive property.

SUMMARY OF THE INVENTION

The inventors of the present invention have made extensive studies in order to achieve the above-mentioned objects, and have found that it is effective to reduce the optical defects to reduce the number of scratches having a specific form on the surface of a base film to not more than a specific value, thereby leading to the completion of the present invention.

In other words, the present invention provides an optical coating film which uses a transparent biaxial oriented thermoplastic resin film having a thickness of 50 μm or more as a base film, and has an adhesive property modifying resin layer on at least one surface of said base film, wherein the number of scratches being 1 μm or more in depth and 3 mm or more in length on the surface of said coating film is 100 pcs/m² or less.

In general optical applications, the number of scratches on the surface of the coating film is required to be reduced to 100 pcs/m² or less. For example, the level in which the number of scratches on the surface of the coating film is 100 pcs/m² or less corresponds to a level in which in the application such as a film for diffusion plate with light rays being observed in a diffused state, those scratches are not recognized as optical defects. Moreover, in the A-class optical application such as liquid crystal protection films, general hard coating films, anti-reflection films, near-infrared-rays absorbing films with transmitting light rays being directly observed, the number of scratches on the surface of the coating film is preferably reduced to 30 pcs/m² or less, which corresponds to a level in which no adverse effects are found even when directly viewed. Furthermore, in the special A-class optical application such as lens films with scratches on the film surface being projected in an enlarged manner and transparent conductive films for touch panel with a hard coating layer on the surface and a transparent conductive film on the rear surface, the number thereof is preferably reduced to 10 pcs/m² or less.

When the number of scratches having such a size exceeds the above-mentioned ranges, the optical defects increase, causing serious degradation in the quality of optical films. Here, "the surface of a coating film" includes both of the surfaces with the above-mentioned adhesive property modifying resin layer and without such a layer.

Moreover, with respect to the above-mentioned scratches, the numbers of scratches in the longitudinal direction and/or scratches in the lateral direction are preferably 50 pcs/m² or less, respectively. More preferably, the numbers of scratches in the respective directions are 30/m² or less, respectively and most preferably to 10/m² or less.

Here, the scratches in the longitudinal direction refer to scratches having a deviation of ±45° or less from the longitudinal direction of the optical coating film in the longest direction. That is, supposing that the traveling direction at the time of manufacturing the optical coating film is the longitudinal direction, those scratches have offsets not more than ±45° from the direction parallel to the winding direction at the time of manufacturing the film. The scratches in the lateral direction refer to scratches that have a deviation of ±45° or less from the width direction of the optical coating film in the longest direction, that is, from the direction perpendicular to the winding direction at the time of manufacturing the film.

In the present invention, "scratches" refer to fine recessed portions and/or protruding portions on the surface of an optical coating film, and includes portions in a protruding state. Here, when the surface of an optical coating film is observed in the vertical direction, irregularities of scratches closely located within 50 μm are defined as the same scratch, and the length and width of a rectangular having a minimum area covering the outermost portions of these scratches are set to the length and width of the scratch. However, even when considered to be the same upon observing with the naked eye, some scratches might be separated when observed under a microscope, the length and width of a scratch are defined as described above. Moreover, the depth of a scratch means the greatest depth in the thickness direction from the surface of an optical coating film, and when the film surface has a swelling portion due to the scratch, the depth of the scratch means the greatest depth from the top of the swelling portion to the bottom thereof.

In a preferred embodiment of the optical coating film of the present invention, a haze value of the coating film is 1.0% or less. More preferably is 0.8% or less, and most preferably is 0.6% or less. In the case when the haze value exceeds 1.0%, the clearness of the image tends to decrease when the optical coating film of the present invention is used as a constituent part for a display.

Moreover, in another preferred embodiment of the optical coating film of the present invention, no particles are substantially contained in the base film, and particles having an average particle size of 0.005 to 1.0 μm are contained in the adhesive property modifying resin layer at 0.1 to 60 mass %. It is more preferable that particles to be contained in the adhesive property modifying resin layer are silica.

Furthermore, in still another preferred embodiment of the optical coating film of the present invention, the base film is made from polyester mainly composed of polyethylene terephthalate and/or polyethylene-2,6-naphthalate, the polyester contains a magnesium compound of 40 to 70 ppm and a phosphor compound of 10 to 55 ppm, and a melt specific resistivity of the polyester is 0.10 to $0.45 \times 10^8$ Ω·cm.

Moreover, in still another preferred embodiment of the optical coating film of the present invention, the adhesive property modifying resin layer of the optical coating film is mainly composed of at least one kind selected from copolymer polyester resin, polyurethane resin and acrylic resin.

DESCRIPTION OF THE PREFERRED EMBODIMENTS (Base Film)

With respect to the base film used in the present invention, the kind of a thermoplastic resin that forms a constituent element is not particularly limited as long as it is a biaxial oriented thermoplastic resin film having a thickness of 50 μm or more, from the viewpoint of its strength and dimension stability. The upper limit value of the thickness of the base film is not limited, however, it is 300 μm from the viewpoint of easiness in handling and the standard of optical members.

From the viewpoint of transparency, dimension stability and chemical resistance, polyester resin is most preferably used among the above-mentioned thermoplastic resins, and examples thereof include polyethylene terephthalate, polybutylene terephthalate, polyethylene-2,6-naphthalate, or copolymers that include a constituent polymer component thereof as its main component, and among these, polyethylene terephthalate (hereinafter, referred to as PET) and/or polyethylene-2,6-naphthalate (hereinafter, referred to as PEN) are more preferably used.

In the case when a polyester resin is used as the constituent element of the base film with the above-mentioned copolymer being used as its component, examples of its dicarboxylic acid component include aliphatic dicarboxylic acids such as adipic acid and sebacic acid, aromatic dicarboxylic acids such as terephthalic acid, isophthalic acid, phthalic acid and 2,6-naphthalene dicarboxylic acid, multifunctional carboxylic acids such as trimelitic acid and pyromelitic acid, and examples of its glycol component include aliphatic acid glycols such as ethylene glycol, diethylene glycol, 1,4-butane diol, propylene glycol and neopentyl glycol; aromatic glycols such as p-xylene glycol; alicycic glycols such as 1,4-cyclohexane dimethanol; and ethylene glycol having an average molecular weight of 150 to 20000.

Here, in the case when a polyethylene resin is used as a constituent material of the base film with the abovementioned copolymer being used as its component, the ratio of the copolymer in the entire polyester resin is preferably less than 20 mass %. The ratio of the copolymer being 20 mass % or more tends to cause degradation in the strength, transparency and heat resistance in the base film.

In the case when a polyester resin is used as the constituent element of the base film, the inherent viscosity of the resin pellets for the polyester resin is preferably in the range of 0.45 to 0.70 dl/g. The inherent viscosity of less than 0.45 dl/g results in an insufficient tear resistance in the base film, causing the film to have susceptibility to frequent tears at the time of manufacturing the film. In contrast, the inherent viscosity exceeding 0.70 dl/g causes an increase in the filtering pressure at the time of filtering in a molten state, making it difficult to carry out a filtering process with high precision.

Moreover, it is preferable for the polyester to contain a magnesium compound of 40 to 70 ppm calculated on a magnesium atom and a phosphor compound of 10 to 55 ppm calculated on a phosphorus atom, and also to have a melt specific resistivity of 0.10 to $0.45 \times 10^8$ Ω·cm; thus, it is possible to prevent deposition of foreign matters due to magnesium atoms and phosphor atoms while maintaining the electrostatic contact property. In particular, the formation of bulky protrusions on the film surface due to deposition of foreign matters causes starting points of scratches.

The thermoplastic resin, which is a constituent element of the base film, may contain various additive agents, if necessary, within a range that does not cause adverse effects on the function of the present invention. Examples of the additive agents include an antistatic agent, a UV absorbing agent and a stabilizing agent.

In order to improve the transparency, the content of particles in the base film to be used in the optical coating film of the present invention is preferably limited to a minimum, and substantially no particle content is more preferable. Here, "substantially no particle content" means a level in which the content of a main component constituting particles in the base film is not more than the detection limit of the fluorescent X-ray analyzing method. In an attempt to improve the transparency while maintaining the handling property and the scratch resistance of the base film, for example, it is possible to achieve this attempt by allowing the base film to contain substantially no particles and allowing only the adhesive property modifying resin layer to contain the particles.

Furthermore, with respect to the base film to be used in the present invention, it is preferable to limit foreign matters inside the base film to a minimum. In order to prevent the base film from containing foreign matters, for example, a method is proposed in which at the time of molding a base film, it is filtered in a molten state. When foreign matters exist inside the base film, crystallization takes place on the periphery of the foreign matter during a cooling process at the time of manufacturing the base film, and during an orientation process at the time of the film manufacturing process, an unevenly oriented state occurs, causing fine differences in thickness with the result that the corresponding portions tend to have a lens state. This lens state causes light refraction or diffusion in the corresponding portion, and when viewed with the naked eye, the foreign matter appears greater than as it actually is, resulting in an image spot.

(Adhesive Property Modifying Resin Layer)

Preferably, an adhesive property modifying resin layer for an optical coating film of the present invention is mainly composed of at least one kind selected from a copolymer polyester resin, a polyurethane resin and an acrylic resin.

With respect to the copolymer polyester resin used for the adhesive property modifying resin layer, not particularly limited, those conventionally known may be used.

Examples of the dicarboxylic acid component of the copolymer polyester resin include; telephthalic acid, isophthalic acid, 2,5-dimethylterephthalic acid, 1,4-naphthalene dicarboxylic acid, 2,6-naphthalene dicarboxylic acid, 1,2-bisphenoxyethane-p,p'-dicarboxylic acid, adipic acid, fumaric acid, sebacic acid, dodecane diacid, etc. and ester forming derivatives thereof.

Examples of the glycol component of the above-mentioned copolymer polyester resin include; ethylene glycol, 1,3-propanediol, 1,4-butanediol, neopentyl glycol, diethylene glycol, 1,4-cyclohexane dimethanol, trimethylol propane, and tricyclodecane dimethylol.

In the film of the present invention, upon forming the adhesive property modifying resin layer, it is preferable to use a so-called in-line coating method, in which the adhesive property modifying resin is applied and dried in an aqueous application liquid dissolved or dispersed an adhesive property modifying resin in water, at the time of manufacturing the film, since this method makes it possible to provide a coating film with a wide width and a thin thickness with high productivity. Therefore, the above-mentioned copolymer polyester resin preferably has a water soluble property or a water dispersing property, and is preferably copolymerized with a compound containing a carboxylate group and/or a sulfonate group.

With respect to the compound containing the above-mentioned carboxylate group, not particularly limited, examples thereof include; trimellitic acid, trimellitic anhydride, pyromellitic acid, pyromellitic anhydride, 4-methylcyclohexene-1,2,3-tricarboxylic acid, trimesic acid, 1,2,3,4-butanetetracarboxylic acid, 1,2,3,4-pentanetetracarboxylic acid, 3,3',4,4'-benzophenone tetracarboxylic acid, 5, (2,5-dioxotetrahydro furfuryl)-3-methyl-3-cyclohexene-1,2-dicarboxylic acid, 5-(2,5-dioxotetrahydro furfuryl)-3-cyclohexene-1,2-dicarboxylic acid, cyclopentane tetracarboxylic acid, 2,3,6,7-naphthalene tetracarboxylic acid, 1,2,5,6-naphthalene tetracarboxylic acid, ethylene glycol bistrimellitate, 2,2',3,3'-diphenyl tetracarboxylic acid, thiophene-2,3,4,5-tetracarboxylic acid, ethylene tetracarboxylic acid or alkali metal salts, alkali earth metal salts and ammonium salts thereof.

With respect to the compound containing the above-mentioned sulfonate group, not particularly limited, examples thereof include; sulfoterephthalic acid, 5-sulfoisophthalic acid, 4-sulfoisophthalic acid, 4-sulfonaphthalene-2,7-dicarboxylic acid, sulfo-p-xylylene glycol, 2-sulfo-1,4-bis(hyroxyethoxy)benzene or alkali metal salts, alkali earth metal salts and ammonium salts thereof.

With respect to the dicarboxylic acid component and the glycol component constituting the above-mentioned copolymer polyester resin, or the compound used for copolymerization, two kinds or more of them may be used simultaneously, respectively.

In addition to these, with respect to the above-mentioned copolymer polyester resin, for example, modified polyester copolymer resin, such as a block copolymer or a graft copolymer, modified by, for example, (metha)acrylic acid, a compound having a urethane bond, or a compound containing an epoxy group, etc., may also be used.

Among these, a polyester graft copolymer of a self-crosslinking type, which is formed by graft cross-linking a hydrophobic copolymer polyester resin with at least one kind of anhydride having a double bond, is superior to adhesive property to an acrylic resin that is a main component of a lens layer of a lens film and a hard coat layer of a hard coating film, and also superior to water resistant property so that it is applicable even under high humidity.

With respect to the polyurethane resin used for an adhesive property modifying layer, any of those having a solvent dissolving property, a water soluble property or a water dispersing property may be used, and it is possible to properly select in accordance with desired physical property and manufacturing method of the adhesive property modifying layer. In the case when the adhesive property modifying resin layer is formed by the in-line coating method of applying and drying an application liquid containing the adhesive property modifying resin during the process of manufacturing the base film, and then drawing at least one axial direction, it is preferable to use an aqueous polyurethane resin having a water soluble property or a water dispersing property.

With respect to the above-mentioned aqueous polyurethane resin, examples thereof include the polyurethane resin which is improved in affinity to water by using a carboxilate, sulfonate, sulfuric acid half ester salt, etc.

With respect to the polyhydroxy compound used for synthesizing the above-mentioned polyurethane resin, examples thereof include; polyethylene glycol, polypropylene glycol, polyethylene-polypropylene glycol, polytetrapropylene glycol, hexamethylene glycol, tetramethylene glycol, 1,5-pentanediol, diethylene glycol, triethylene glycol, polycaprolactone, polyhexamethylene adipate, polyhexamethylene sebacate, polyhexamethylene adipate-polyhexamethylene sebacate, trimethylol propane, trimethylol ethane, pentaerythritol and glycerin.

With respect to the polyisocyanate compound used for synthesizing the above-mentioned polyurethane resin, examples thereof include; hexamethylene diisocyanate, diphenylmethane diisocyanate, tolylenediisocyanate, isophoronediisocyanate and an additive of tolylenediisocyanate and trimethylolethane.

With respect to polyols containing carboxylic acid used for synthesizing the above-mentioned polyurethane resin, examples thereof include; dimethylol propionic acid, dimethylol lactic acid, dimethylol valeric acid and trimellitic acid bis(ethylene glycol) ester.

With respect to a carboxylic acid containing amino acid used for synthesizing the above-mentioned polyurethane resin, examples thereof include; β-amino propionic acid, γ-amino lactic acid and p-amino benzoic acid.

With respect to a carboxylic acid containing a hydroxyl group used for synthesizing the above-mentioned polyurethane resin, examples thereof include; 3-hydroxypropionic acid, γ-hydroxylactic acid, p-(2-hydroxyethyl) benzoic acid and malic acid.

With respect to a compound having an amino group or a hydroxyl group and a sulfonic acid group used for synthesizing the above-mentioned polyurethane resin, examples thereof include; amino methane sulfonic acid, 2-amino ethane sulfonic acid, 2-amino-5-methylbenzene-2-sulfonic acid, β-hydroxyethane sodium sulfonate, propane sultone and butane sultone additional products or the like of aliphatic di-primary amine compound, and preferably a propane sultone additive of aliphatic di-primary amine compound is used.

With respect to the compound containing an amino group or a hydroxyl group and a sulfuric semi-ester* that is used for synthesizing the above-mentioned polyurethane resin, examples thereof include; amino ethanol sulfuric acid, amino butanol sulfuric acid, hydroxyethanol sulfuric acid and α-hydroxybutanol sulfuric acid.

With respect to components or compounds to be used for synthesizing the polyurethane resin, two or more kinds thereof may be used simultaneously.

Furthermore, with respect to the above-mentioned polyurethane resin, well-known polyurethane resins having an anionic group, disclosed in Japanese Examined Patent Publication No. 42-24194 (1967), Japanese Examined Patent Publication No. 46-7720 (1971), Japanese Examined Patent Publication No. 46-10193 (1971), Japanese Examined Patent Publication No. 49-37839 (1974), Japanese Unexamined Patent Application No. 50-123197 (1975), Japanese Unexamined Patent Application No. 53-126058 (1978) and Japanese Unexamined Patent Application No. 54-138098 (1979), or the like polyurethane resins may be used.

Main constituent components of the above-mentioned polyurethane resin are; polyisocyanate, poliols, a chain extending agent, a crosslinking agent, etc. Moreover, a resin composed of poliols having a molecular weight of 300 to 20000, polyisocyanate, a chain extending agent having a reactive hydrogen atom, a group that is allowed to react with an isocyanate group, and a compound having at least one anionic group are preferable. The anionic group in the polyurethane resin is preferably selected from —$SO_3H$, —$OSO_2H$, —COOH, and an ammonium salt, a lithium salt, a sodium salt, a potassium salt and a magnesium salt thereof.

With respect to a monomer component constituting an acrylic resin used for an adhesive property modifying resin layer, not particularly limited, those conventionally known components may be used. Examples thereof include; alkyl acrylate, alkyl methacrylate, (with respect to an alkyl group, methyl group, ethyl group, n-propyl group, t-butyl group, 2-ethylhexyl group, lauryl group, stearyl group, cyclohexyl group, phenyl group, benzyl group, phenyl ethyl group, etc. are listed), monomers containing a hydroxyl group, such as 2-hydroxyl ethylacrylate, 2-hydroxypropyl acrylate and 2-hydroxypropylmethacrylate, monomers containing an amide group, such as acrylamide, N-methyl acryl amide, N-methylol acrylamide, N-methylol methacrylamide, N,N-dimethylol acrylamide, N-methoxymethyl acrylamide and N-phenyl acrylamide, monomers containing an amino group, such as N,N-diethylamino ethylacrylate and N,N-dietylamino ethylmethacrylate, monomer containing an epoxy group, such as glycidyl acrylate and glycidyl methacrylate, monomers containing a carboxyl group or a salt thereof, such as acrylic acid and methacrylic acid and salts thereof (lithium salt, sodium salt, potassium salt, etc.), and one kind or two kinds or more thereof are used, and co-polymerized. Furthermore, in addition to the above-mentioned monomers, other kinds monomers may be used simultaneously.

With respect to monomers of the other kinds, for example, monomers containing an epoxy group such as allyl glycidyl ether, monomers containing a sulfonic acid group or a salt thereof, such as styrene sulfonic acid, vinyl sulfonic acid and salts thereof (lithium salt, sodium salt, potassium salt, ammonium salt, etc.), monomers containing a carboxyl group or a salt thereof, such as crotonic acid, itaconic acid, maleic acid, fumaric acid and a salt thereof (lithium salt, sodium salt, potassium salt, ammonium salt, etc.), monomers containing an acid anhydride such as maleic anhydride and itaconic anhydride, and vinyl isocyanate, allyl isocyanate, styrene, vinylmethyl ether, vinylethyl ether, vinyltrisalcoxysilane, alkyl maleic acid monoester, alkyl fumaric acid monoester, acrylonitrile, methacrylonitrile, alkyl itaconic acid monoester, vinylidenechloride, vinylacetate, vinylchloride etc.

In addition to these, with respect to the above-mentioned acrylic resin, for example, a modified polyester copolymer resin, such as a block copolymer or a graft copolymer, modified by, for example, a compound having a urethane bond, or a compound containing an epoxy group, etc., may also be used.

The number average molecular weight of the acrylic resin is preferably 100,000 or more, more preferably 300,000 or more, thus, it is possible to properly ensure the adhesion to a deposited member such as a lens layer, a hard coating layer, an anti-reflection layer and a protecting layer that are formed through a secondary process of the base film and/or the optical coating film of the present invention.

The above-mentioned copolymer polyester resin, polyurethane resin and acrylic resin may be used alone or two or more kinds thereof can be used simultaneously. In particular, the combination of the polyester resin and the polyurethane resin makes it possible to obtain good adhesive property and solvent resistant property, and this combination is recommendable.

In the present invention, the formation of the adhesive property modifying resin layer is carried out by, for example, applying an application liquid containing the above-mentioned components to the base film, however, the above-mentioned components may be dissolved and dispersed in the solvent upon preparing the above-mentioned application liquid.

Furthermore, in order to accelerate the thermal cross-linking reaction, a catalyst may be added to the above-mentioned application liquid. With respect to the catalyst, examples thereof include; various chemical substances such as inorganic substances, salts, organic substances, alkaline substances, acidic substances and metal-containing organic compounds.

In the case when an aqueous solution is used as the above-mentioned application liquid, an alkaline substance and/or an acidic substance may be added so as to adjust the pH thereof.

In order to improve the wettability to the surface of the base film so as to apply the application liquid evenly at the time of the applying to the base film, a surface active agent may be added thereto by a necessary amount. With respect to the surfactant, well-known anionic surfactants or nonionic surfactants may be used.

With respect to the solvent to be used in the above-mentioned application liquid, water is preferably used, and in addition to this, alcohols such as ethanol, isopropyl alcohol and benzyl alcohol may be blended thereto. In the case when alcohols are used, the ratio of the alcohols accounting for the entire application solution is preferably less than 50 mass %. Furthermore, organic solvents other than alcohols may be mixed therein in a dissolvable range. In the case when an organic solvent other than alcohols is used, the ratio of the other organic solvent to the entire application solution is preferably less than 10 mass %, and the total of the alcohols and the other organic solvent is preferably less than 50 mass % with respect to the entire application solution.

When the ratio of blend of the organic solvent containing alcohols to the entire application solution is less than 50 mass %, it is possible to improve the drying property of the application liquid when it is dried, and it is also possible to improve the appearance of the adhesive property modifying resin layer in comparison with the case in which only water is used as the solvent. When it is 50 mass % or more, the evaporating rate of the solvent is fast, causing a change in the concentration while the application liquid is being applied, thus, since this causes an increase in the viscosity and the resulting reduction in the applying property, the appearance of the coated adhesive property modifying resin layer tends to deteriorate.

As described above, in the present invention, it is more preferable not to allow the base film to contain particles from the viewpoint of transparency, therefore, it is preferable to allow the adhesive property modifying layer to contain particles with the surface of the adhesive property modifying resin layer being provided with appropriate protrusions. In order to allow the adhesive property modifying layer to contain particles, for example, a method is proposed in which particles are added to the application liquid for forming the adhesive property modifying resin layer.

With respect to the above-mentioned particles, examples thereof include; inorganic particles, such as calcium carbonate, calcium phosphate, silica, kaolin, talc, titanium dioxide, alumina, barium sulfate, calcium fluoride, lithium fluoride, zeolite and molybdenum sulfide, and organic particles such as crosslinking high polymer particles and calcium oxalate. Among these particles, in the case when the adhesive property modifying resin layer is mainly formed by polyester resin, silica is most preferable since it is comparatively close to the polyester resin in the refractive index and since it easily provides high transparency.

The above-mentioned particles to be contained in the adhesive property modifying resin layer are preferably to have an average particle size from 0.005 to 1.0 $\mu$m from the viewpoint of transparency, handling property and scratch resistant property. The upper limit value of the average particle size is more preferably 0.5 $\mu$m, and most preferably 0.2 $\mu$m, from the viewpoint of transparency. Moreover, the lower limit value of the average particle size of the particles is more preferably 0.01 $\mu$m, and most preferably 0.03 $\mu$m, from the viewpoint of handling property and scratch resistant property.

The content of the particles contained in the adhesive property modifying resin layer is preferably 0.1 to 60 mass % to the entire constituent components of the adhesive property modifying resin layer, from the viewpoint of transparency, adhesive property, handling property and scratch resistant property. The upper limit value of the content of the particles is more preferably 50 mass %, and most preferably 40 mass %, from the viewpoint of transparency and adhesive property. Moreover, the lower limit value of the content of the particles is more preferably 0.5 mass %, and most preferably 1 mass %, from the viewpoint of handling property and scratch resistant property.

With respect to the above-mentioned particles, two kinds or more may be used simultaneously, or particles of the same type having different particle sizes may be blended, however, in any case, the average particle size of the entire particles and the total content are preferably set to satisfy the above-mentioned ranges.

Here, in the case when the application liquid for forming the adhesive property modifying layer is applied, it is preferable to filter the application liquid through a filtering member with precision immediately before the application in order to remove coarse aggregated portions of the particles and foreign matters in the application liquid.

The filtering member for filtering the application liquid for forming the adhesive property modifying resin layer with precision is preferably to have a particle filtering size of 25 $\mu$m or less (initial filtering efficiency: 95%). When the filtering particle size exceeds 25 $\mu$m, it becomes impossible to sufficiently remove coarse aggregated portions of the particles and foreign matters. For this reason, in particular, many coarse aggregated portions of the particles that have not been removed by the filtering member might expand in the drawing direction of the film over the adhesive property modifying resin layer when, after the application liquid has been applied and dried, this is monoaxially or biaxially oriented, with the result that they might be recognized as aggregated matters of 100 $\mu$m or more. Consequently, many optical defects might be raised.

The type of the above-mentioned filtering member is not particularly limited as long as it possesses the above-mentioned performance, and for example, those of the filament type, felt type and mesh type are included.

The material of the filtering member is not particularly limited as long as it has the above-mentioned filtering performance, and does not cause any adverse effects on the application liquid, and examples thereof include; stainless, polyethylene, polypropylene and nylon.

Various additive agents such as an antistatic agent, a ultraviolet-ray absorbing agent, a plasticizer, a light stabilizer and a lubricating agent may be mixed to the adhesive property modifying resin layer to an extent not to impair the effects of the present invention. Furthermore, in the case when an aqueous application liquid is used for forming the adhesive property modifying resin layer, other aqueous resin, water-dispersing resin, emulsion, etc. may be added to the application liquid to an extent not to impair the effects of the present invention, in order to improve the performance.

In the case when a coating method for applying the application liquid is used as the method for forming the adhesive property modifying resin layer on the base film, the solid component concentration in the application liquid is preferably 30 mass % or less, and more preferably 10 mass % or less.

In the present invention, the method for forming the adhesive property modifying resin layer on the base film is not particularly limited, and predetermined amounts of constituent components of the adhesive property modifying resin and a solvent, if necessary, are preliminarily mixed to prepare an application liquid, and the application liquid is applied to the base film, by using, for example, the following normal coating methods; reverse roll coating method, gravure coating method, kiss coating method, roll brush coating method, spray coating method, air knife coating method, wire bar coating method, pipe doctor method, impregnation-coating method and curtain coating method, and these coating methods may be used alone, or a plurality of the methods may be used simultaneously.

Moreover, the adhesive property modifying resin layer may be provided on the surface of a base film that has been subjected to a biaxial drawing process, however, it is more preferable to simultaneously carry out the manufacturing process of the film and the formation of a coat layer in the manufacturing process of the base film from the viewpoint of productivity. The step for applying the coat layer onto the base film may be carried out at any time, after an un-oriented film has been formed, after a mono-axial oriented film has been formed, or after a biaxial oriented film has been formed, however, it is preferable to further carry out a drawing process in at least one direction after the application liquid has been applied to the film. More preferably, with respect to an un-oriented film that has not been oriented in the width direction or a longitudinal mono-axial oriented film, the application liquid is preferably applied thereto at a stage prior to the completion of crystal orientation. More preferably, the application liquid may be applied to the surface of the longitudinal mono-axial oriented film and then drawn in the width direction, or the application liquid may applied on an un-oriented film, and this may be simultaneously oriented biaxially.

In the case when a method for applying an application liquid is used as the method for forming the adhesive property modifying resin layer on the surface of a base film, the amount of application is preferably 0.04 to 5 g per 1 m$^2$ of a traveling film at the final point after manufacturing the optical coating film, from the viewpoint of the coating uniformity, blocking resistant property, contacting property and transparency. The lower limit value of the amount of application is more preferably 0.08 g/m$^2$, and most preferably 0.2 g/m$^2$ from the viewpoint of contacting property and transparency. Moreover, the upper limit value of the amount of application is more preferably 4 g/m$^2$, and most preferably 2 g/m$^2$, from the viewpoint of the application uniformity and blocking resistant property. When the amount of application is too small, the contacting property between the base film and the adhesive property modifying resin layer tends to decrease, and the particles in the coat layer consequently tend to come off. When the amount of application is too great, there is degradation not only in transparency and blocking resistant property, but also in the physical property and rheology; consequently, it becomes difficult to uniformly apply the film due to subsequent problems with the facility.

(Manufacturing Method of Optical Coating Film)

With respect to the manufacturing method of an optical coating film of the present invention, the following description will discuss its specific embodiment in which a manufacturing method using a base film made of PET is exemplified. However, the present invention is not intended to be limited by this method.

After PET pellets that contained substantially no particles are fully vacuum-dried, these are supplied to an extruder, and extruded as a sheet in a melted state at approximately 280° C., and this is allowed to contact on a metal cooling roll to be solidified thereon while applying static electricity to prepare an un-oriented PET sheet. In this case, the melted PET resin is subjected to a filtering process with high precision through a predetermined melt line in which it is maintained at 280° C., so as to remove foreign matters contained in the PET resin. The filtering member to be used in the high-precision filtering process of the melted PET resin is not particularly limited, however, a filtering member made of stainless sintered material is preferably used, since it is superior to the removing property of metal Sb deposited after reduction of $Sb_2O_3$ that is a polymerizing catalyst of polyester resin and aggregated matters and high-melting point organic substances mainly composed of Si, Ti, Sb, Ge and Cu, that are externally mixed therein during steps from polymerization to pellet formation.

The filtering particle size (initial filtering efficiency: 95%) of the above-mentioned filtering member is preferably 15 µm or less. The filtering member having a filtering particle size exceeding 15 µm fails to sufficiently remove particles having sizes that should be removed from the viewpoint of optical defects. The application of the filtering member having the above-mentioned filtering performance so as to carry out a filtering process of the melted PET resin with precision might cause degradation in the productivity, however, the application thereof is necessary so as to obtain a film having less optical defects.

The resulting un-oriented film is oriented 2.5 to 5.0 times in the length direction (longitudinal direction: the traveling direction of an optical coating film during the manufacturing process) by a roll heated to 80 to 120° C., thereby providing a mono-axially oriented PET film. In this case, in order to prevent the occurrence of scratches on the film, the following points are important: (a) the film surface itself and the roll surface, in particular, the roll surface to contact the film, should be maintained free from defects that cause scratches; and (b) the film should be maintained on the surface of the contacting roll in a manner so as not to be deviated longitudinally as well as laterally.

The above-mentioned defects refer to all factors formed on the roll surface, such as scratches, depositions, adhering matters and foreign matters, that might cause fine scratches on the film upon contact with the film, and by eliminating these, it is possible to reduce the occurrence of scratches on the film surface. In order to prevent the occurrence of the above-mentioned defects, for example, the following methods are listed.

One method is proposed in which the surface roughness Ra of the roll is reduced to 0.1 µm or less at the time of manufacturing the optical coating film, and another method is proposed in which in order to prevent accumulation of the scratch-causing factors such as depositions, adhering matters and foreign matters, onto the surface of the roll, roll cleaners are placed on a preheating inlet and a cooling roll in the longitudinal drawing (MD) process.

Moreover, still another method is proposed in which the degree of cleanliness in the manufacturing process of the optical coating film is maintained at class 1000 or less (1000 or less of particles having a size of 0.5 µm or more per one cubic foot) in the manufacturing process of the optical coating film, and in particular, it is more preferable to maintain the degree at class 100 or less in the periphery of the roll and also to maintain the degree at class 100 or less with respect to a air-blow cooling device for cooling the reversed role surface in the casting process.

Furthermore, still another method is proposed in which prior to the manufacturing process of the optical coating film, defects on the roll are ground therefrom by using an abrasive material so as to clean the roll. In still another method, in order to avoid the possibility of the film absorbing dusts, etc., due to the generation of static electricity to form defects, a static eliminating device is installed so as to reduce the amount of charge of the film to ±1500 V or less in the entire processes. Processes from casting to the tenter are processes that are susceptible to the occurrence of scratches, and by designing these sections in a compact manner so as to reduce the transmitting time to 5 minutes or less, thus, it also becomes possible to reduce the occurrence of the defects.

With respect to the roll, by forming a water film on the surface of the roll, or providing the roll as a roll of an air-floating type, it is possible to provide a structure that prevents defects on the surface of the roll from directly contacting the film. Moreover, by reducing the amount of oligomer depositing from the film to 1000 ppm or less, it becomes possible to reduce the adhesion of defects onto the roll surface.

The surface on the edge side in the width direction of the film (lateral direction: a direction perpendicular to the traveling direction of the optical film at the time of the manufacturing process) is pressed by a roller with a protrusion so as to form irregular portions in this section, and the film with the irregular portions is wound up into a roll shape by a winding mechanism, and the protrusion in the above-mentioned roller with the protrusion is formed into a shape narrowed toward the top with the top of the protrusion forming a round shape so that the radius of the curvature of the top face is set to 0.4 mm or less, thus, the film winding device is allowed to prevent defects from contacting the film.

On the other hand, with respect to a method for preventing the film from deviating on the surface of the roll, for example, the following methods are listed.

By decreasing the contacting force of the film onto the roll by reducing the diameter of the roll, or contacting devices such as a suction roll, electrostatic contact and a part nipping device, it becomes possible to suppress the occurrence of long scratches. In particular, by reducing the diameter of the roll, the amount of deviation of the film is finely divided, thereby making it possible to prevent the generation of long scratches. Moreover, in most of scratches, the length and frequency of scratches increase toward the end portions in the roll width direction, and it is difficult to obtain a portion without scratches at the end portions in the roll width direction, therefore, by trimming the center portion in the roll width direction with fewer scratches, it is possible to obtain a film with fewer scratches.

Scratches in the longitudinal and lateral directions are formed by deformations, such as expansion and shrink, in the respective longitudinal or lateral direction in the film. The driving force to these deformations is mainly caused by film deformation due to temperature changes. For example, by suppressing the temperature change in the film on the roll surface, it is possible to reduce the amount of deformation in the film due to temperatures, and consequently to prevent the occurrence of scratches in the longitudinal and lateral directions.

More specifically, the temperature change in the film per roll is set to 40° C. or less, preferably 30° C. or less, more preferably 20° C. or less, most preferably 10° C. or less, and by far the most preferably 5° C. or less.

With respect to the method for suppressing the temperature change of the film on the roll surface, for example, a cooling operation in the air between rolls and a water cooling operation for allowing the roll to pass through a water vessel are proposed. Furthermore, by increasing the number of rolls, it is possible to reduce the temperature change of the film on the roll surface per roll. Preferably, the number of rolls in the MD process is set to 10 or more.

Moreover, the relationship between the relative speeds of a plurality of rolls is set to a speed profile that is closest to the amount of deformation due to the film temperature and tension so that it is possible to reduce the deviation in the longitudinal direction.

Furthermore, in the application process of the application liquid for forming the adhesive property modifying resin layer, with respect to the drying conditions, the drying process is finished at the initial period in the dryer section, and a cooling process is carried out toward the outlet, thus, the film temperature at the dryer outlet is set to 40° C. or less so as to reduce the deviation due to temperature changes.

With respect to the tension given by the traveling film, if it is too low, the gripping force is reduced to cause the deviation, while if it is too high, the stress deformation increases to cause the deviation, therefore, the driving roll speed is properly set by a tension adjusting means so as to be located within an appropriate tension range from 4.9 to 29.4 MPa. Moreover, the coefficient of friction between the film and the roll at the application temperature during the manufacturing process is set to 0.2 or more so that it is possible to reduce the deviation of the film on the roll surface.

Moreover, the free roll is preferably designed to have special bearings so as to provide a rotation resistance of 19.6 N or less. With respect to the driving roll, it is preferably controlled so as to reduce the rotation marks to 0.01% or less.

The film that has been mono-axially oriented is subjected to a stress in the longitudinal direction applied to transport the film and a deforming stress corresponding to the Poisson's ratio and the elastic modulus in a direction orthogonal to this direction, with the result that the deviation is generated in the lateral direction. In order to reduce this stress and also to reduce the thermal shrinkage stress possessed by the film, it is preferable to allow this to have a low orientation within a range so as not to give adverse effects on the film physical property. More specifically, it is preferable to form a mono-axial oriented film having a low orientation in which the difference in refractive indexes in the X-axis direction [(the refractive index in the X-axis direction of the mono-axial oriented film)–(the refractive index in the X-axis direction of the un-oriented film)] is set in the range of 0.01 to 0.12.

Furthermore, by using a biaxial orientation method in which no rolls are used upon orientation, it is possible to obtain a film that has no contact with defects on the surface of a roll and that is less susceptible to the occurrence of scratches. With respect to the above-mentioned biaxial orientation method, a method for using a linear motor or a method for using a simultaneous biaxial orientation device having a conventional pantograph mechanism are proposed.

With respect to the above-mentioned methods for preventing the generation of scratches, a plurality of kinds of methods may be used simultaneously in accordance with the level of required quality in the optical members in which the optical coating film of the present invention is used.

Here, at a desired stage in the processes for forming the base film, the aforementioned application liquid for forming an adhesive property modifying resin layer is applied on at least one surface of the base film so that the adhesive property modifying resin layer is formed thereon.

The above-mentioned mono-axial oriented PET film is directed to the tenter so as to be drawn in the width direction (lateral direction a direction perpendicular to the traveling direction of the film) and to be thermally fixed, and in the case when the application liquid for forming the adhesive property modifying resin layer is applied thereto, this is heated in the tenter to form a more stable coat film through a thermal cross-linking reaction, thus, it is possible to form the adhesive property modifying resin layer.

The optical coating film of the present invention may be further provided with other layers within a range so as not to impair the effects of the present invention.

The optical coating film of the present invention, which is superior to the transparency, adhesive property and optical performances, is suitably applied to a base film for prism lens sheet, a base film for hard coating film, a base film for anti-reflection (AR) film, a base film for diffusion plate, used for a liquid crystal display (LCD), an anti-destruction film for cathode ray tube (CRT), a transparent conductive film used for touch panel and electro-luminescence, and a nearinfrared-rays absorbing film and an electromagnetic-waves absorbing film used for a front panel of plasma display.

Referring to Examples, the following description will be given the present invention in more details, however, the present invention is not intended to be limited by Examples. The properties of the respective coating films used in the Examples and Comparative Examples were evaluated by the following methods.

(1) Detection of Scratches

Sixteen sample pieces, each having a size of 250 mm×250 mm, were prepared from an optical coating film, and from both of the surfaces of each sample piece, optical defects, which were optically recognized to have a size of 50 $\mu$m or more, were detected by the following optical defect detecting method.

(Optical Defect Detecting Method)

Two fluorescent lamps of 20 W were placed 400 mm under an XY table as a light-projecting device, and a sample piece to be measured was placed on a mask with a slit width of 10 mm set on the XY table. Light was made incident thereon with a line connecting the light-projecting device and a light-receiving device and the vertical direction to the surface of the sample piece being set to make an angle of 12°, thus, if there is any scratch on the sample piece on the light incident position, the corresponding portion gives off a beam so that the quantity of light at this portion is converted to an electric signal by using a CCD image sensor camera placed 500 mm above the XY table, and the electric signal is amplified and subjected to differential calculations, and then the resulting signal is compared by a threshold level and a comparator, thereby outputting a detection signal of the optical defect. Moreover, by using the CCD image sensor camera, an image of the scratch is inputted and the video signal of the inputted image is analyzed through a predetermined sequence so as to measure the size of the optical defect, thus, positions of defects having a size of 50 $\mu$m or more are displayed. The detection of the optical defects was carried out on both of the surfaces of the sample piece.

(2) Measurement on the Size of a Scratch

From the optical defect portions detected in the above-mentioned (1), defects due to scratches were selected. The above-mentioned sample piece was cut into pieces having an appropriate size, and the surface of the sample piece was observed in the vertical direction therefrom by using a three-dimensional shape measuring device, TYPE 550 made by Micromap Corporation, to measure the size of a scratch. Here, when the surface of the sample piece, that is, the film surface, was observed in the vertical direction, irregularities of scratches closely located within 50 $\mu$m were defined as the same scratch, and the length and width of a rectangular having a minimum area covering the outermost portions of these scratches were set to the length and width of the scratch. Then, those scratches having the rectangular whose length direction was measured ±45° or less from the longitudinal direction (traveling direction of the optical film at the time of the manufacturing process) were defined as longitudinal-direction scratches, and those scratches having the rectangular whose length direction was measured less than ±45° from the lateral direction (orthogonal direction to the longitudinal direction), thus, the depth (the difference between the highest portion of a scratch and the lowest portion thereof) and the length were measured. Based upon the results, the numbers (pcs/m$^2$) of those longitudinal-direction scratches and lateral-direction scratches, each having a depth of 1 $\mu$m or more and a length of 3 mm or more, and the entire scratches were measured.

(3) Adhesive Property

A photo-curing-type acrylic hard coating agent (Seika Beam EXF01 (B) made by Dainichiseika Colour & Chemicals Mfg. Co., Ltd.) was applied onto the coating layer surface of the sample film by using a #8 wire bar, and dried for one minute at 70° C. and after having removed the solvent, this was subjected to a process under the conditions of 200 mJ/cm$^2$ of a high-pressure mercury light, an irradiation distance of 15 cm and a traveling rate of 5 m/min., thereby forming a hard coating layer having a thickness of 3 $\mu$m. The resulting hard coating film was subjected to a test in compliance with a method described in 8.5.1 of JIS-K5400 so as to find the adhesive property between the hard coating layer and the coating layer of the sample film. More specifically, 100 cuts in a mesh shape that penetrate the coating layer to reach the base film were formed by using a cutter guide having a gap distance of 2 mm. Next, a cellophane tape (#405, made by Nichiban Co., Ltd.; width 24 mm) was affixed to the cut surface in the mesh shape, and after this had been completely adhered thereto by rubbing this with an eraser, this was vertically separated and the adhesive property was found from the following equation through a visual observation. Here, those mesh sections having a partially separated area were counted as the separated mesh sections.

Adhesive property (%)=(1−number of separated mesh sections/ number of mesh sections)×100

(4) Wet Endurance Contacting Property

The hard coating film obtained through the above-mentioned method (3) was placed still under an atmosphere of 60° C. with 90 RH %. After a lapse of 500 hours, the film was taken out, and left for 12 hours or more under an atmosphere of 23° C. with 60 RH %. With respect to this film, the adhesive property tests were repeated three times in compliance with the method described in 8.5.1 of JIS-K5400 so as to find the adhesive property.

(5) Haze

Measurements were carried out by using a haze meter (Model TC-H3DP, made by Tokyo Denshoku Kogyo K.K.) in compliance with JIS-K7105.

(6) Intrinsic Viscosity of Polyester

Polyester was dissolved in a mixed solvent of 60 mass % of phenol and 40 mass % of 1,1,2,2-tetrachloroethane, and measurements were made at 30° C.

(7) Element Analysis

The element analysis was carried out by using the following method to determine the respective amounts of elements in polyester.

(a) Analysis of Mg

A sample was subjected to an ashing process in a platinum crucible to be decomposed, and to this was added hydrochloric acid of 6 mol/L, and then evaporated, and dried into a solid state. This was dissolved in hydrochloric acid of 1.2 mol/L, and Mg was subjected to a quantitative analysis by using an ICP emission analyzer (ICPS-2000, made by Shimadzu Corporation).

(b) Analysis of P

A sample was subjected to a dry-type ashing process to be decomposed under a co-existence of carbonic acid soda, or a wet-type decomposing process in a sulfuric acid-nitric acid-perchloric acid system or a sulfuric acid-hydrogen peroxide aqueous system so that phosphor was converted to orthophosphoric acid. This was then allowed to react with molybdate in a sulfuric acid solution of 1 mol/L to form phosphor molybdate; then, this was reduced by hydrazine sulfate, and the absorbance of the resulting hetero poly blue with 830 nm was measured by an absorption meter (UV- 150-02, made by Shimadzu Corporation) to be calorimetrically determined.

(c) Analysis of Sb

A sample was subjected to a wet-type decomposing process in a sulfuric acid-hydrogen peroxide aqueous system, and to this was added sodium nitrite to form $S^{5+}$; then, to this was further added Brilliant Green to form a blue complex with Sb and this was extracted by toluene and the absorbance of the resulting complex with 625 nm was measured by an absorption meter (UV-150-02, made by Shimadzu Corporation) to be calorimetrically determined.

(8) Melt Specific Resistivity of Polyester

Two electrodes (stainless wires) were put in polyester in a molten state at 275° C., and an electric current ($i_o$) was measured upon application of a voltage of 120 V, and the specific resistivity Si(Ω·cm) was found from the following equation.

$$Si(\Omega \cdot cm) = (A/L) \times (V/i_o)$$

where A is an area (cm$^2$) between the electrodes, L is a distance between the electrodes, and V is a voltage (V).

(9) Color Tone of Polyester

The L-value and b-value were measured by using a color difference meter (MODEL TC-1500MC-88, made by Tokyo Denshoku (K.K.)).

EXAMPLES

Example 1

Pellets of PET resin containing no particles with an intrinsic viscosity of 0.62 dl/g, which serve as a material of a base film, were vacuum-dried (1 Torr) for six hours at 135° C., and the resulting resin was then supplied to an extruder, and was extruded into a film shape in a melted state at approximately 280° C., and quickly cooled and solidified on a metal roll whose surface temperature was maintained at 20° C., thereby obtaining a cast film having a thickness of 1400 μm. During the melted state, this was subjected to a precision-filtering process by using a sintered filtering member made of stainless having a filtering particle size (initial filtering efficiency 95%) of 15 μm as a foreign-matter removing filtering member for the melted resin. Next, the above-mentioned cast film was heated to 100° C. by using a group of heated rolls and an infrared heater, and then drawn 3.5 times in the length direction (traveling direction) by using a group of rolls having differences in the peripheral velocity to obtain a mono-axial oriented PET film.

With respect to all the rolls used in the film manufacturing process, the surface roughness Ra of each roll was maintained at 0.1 μm or less and roll cleaners were placed at a preheating inlet and a cooling roll in a longitudinal drawing process. The roll diameter in the longitudinal drawing process was set to 150 mm with the film being made in closely contact with the roll by using contacting devices such as a suction roll, electrostatic contact and a part nipping device.

On the other hand, with respect to an application liquid for an adhesive property modifying resin layer, to a mixed solvent composed of 60 mass % of water and 40 mass % of isopropyl alcohol was added a copolymer polyester resin dispersing solution (MD-1200 made by Toyo Boseki Kabushiki Kaisha) so as to form 4 parts by mass with respect to the total amount 100 parts by mass of the mixed solvent and the resin dispersing solution, and to this was further added colloidal silica (Snowtechs 20L made by Nissan Chemical Industries, Ltd., average SEM particle size: 45 nm) so as to form 5 parts by mass with respect to the total amount 100 parts by mass of the solid components, and these were mixed and dispersed. The resulting dispersion mixed solution was precision-filtered by using a filtering member made of felt-type polypropylene having a filtering particle size (initial filtering efficiency: 95%) of 25 μm, and applied onto one surface of the above-mentioned mono-axial oriented PET film by using a reverse roll method.

After the application, this was directed to a hot-air zone heated to 70° C. with the end of the film being held by a clip, and after having been dried for 15 seconds, this was drawn 4.0 times in the width direction (a direction orthogonal to the traveling direction) at 115° C., and then thermally fixed at 230° C. to obtain a biaxial oriented PET film with a thickness of 100 μm having an adhesive property modifying resin layer whose final amount of coat was set to 0.25 g/m$^2$ on one surface. A center portion corresponding to 1.3 m of the entire width of the biaxial oriented PET film was trimmed to prepare an optical coating film of Example 1. The results obtained are shown in Table 1.

Example 2

An optical coating film was obtained by using the same method as Example 1, except for the following points. The results obtained are shown in Table 1.

With respect to all the rolls used in the film manufacturing process, neither the above-mentioned rolls whose surface roughness Ra was maintained at 0.1 μm or less were used, nor the roll cleaners were placed. Furthermore, the roll diameter used in the longitudinal drawing process was set to 300 mm, and none of the contacting devices such as suction rolls, electrostatic contact and a part nipping device were used.

Moreover, the thickness of the cast film was set to 1750 μm, and the thickness of the biaxial oriented PET film was set to 125 μm. With respect to the degree of cleanliness in the film manufacturing process, clean air of class 100 or less was used on the periphery of the rolls, and clean air of class 100 or less was also used for the air-blow cooling device for cooling the reversed roll face in the cast process. Prior to the film manufacturing process, a process for grinding defects on the surface of each roll was carried out by using a roll abrasive material. Moreover, the temperature change of the film on the roll was reduced to 10° C. or less through air cooling between the rolls, Furthermore, the number of rolls was set to 12, thereby reducing the temperature change per roll.

Example 3

An optical coating film was obtained by using the same method as Example 1, except for the following points. The results obtained are shown in Table 1.

With respect to all the rolls used in the film manufacturing process, neither the above-mentioned rolls whose surface roughness Ra was maintained at 0.1 μm or less were used, nor the roll cleaners were placed. Moreover, the roll diameter used in the longitudinal drawing process was set to 300 mm, and none of the contacting devices such as suction rolls, electrostatic contact and a part nipping device were used.

Moreover, the thickness of the cast film was set to 2632 μm, and the thickness of the biaxial oriented polyethylene terephthalate film was set to 188 μm. A static eliminating device was installed so as to set the quantity of charge in the film to ±1500 V or less during the entire film manufacturing process. The passage time from the casting to the tenter inlet was set to 4 minutes, and with respect to the roll speeds of a plurality of rolls, a speed profile was set so as to become most close to the deformation amount due to the temperature and tension of the film, thereby suppressing a deviation in the film in the longitudinal direction. With respect to the drying conditions in the application process of the application liquid for the adhesive property modifying resin layer, the drying process was completed in the initial state in the dryer section, and a cooling process was carried out toward the outlet so that the temperature of the film at the dryer outlet was set to 29° C. Moreover, the driving roll was speed-adjusted and also adjusted by a tension adjusting device so that the tension at the time of film traveling was set to 11.8 MPa.

Example 4

An optical coating film was obtained by using the same method as Example 1, except for the following points. The results obtained are shown in Table 1.

With respect to all the rolls used in the film manufacturing process, neither the above-mentioned rolls whose surface roughness Ra was maintained at 0.1 μm or less were used, nor the roll cleaners were placed. Moreover, the roll diameter used in the longitudinal drawing process was set to 300 mm, and none of the contacting devices such as suction rolls, electrostatic contact and a part nipping device were used.

Here, with respect to a foreign matter removing-use filtering member for the molten resin for forming the base film, a sintered filtering member made of stainless steel having a filtering particle size (initial filtering efficiency: 95%) of 10 μm was used, and the thickness of the biaxial oriented polyethylene terephthalate film was set to 125 μm. Moreover, all the rolls used in the film manufacturing process were made as rolls of an air-floating type so as to form an arrangement that prevents defects on the roll surface from directly contacting the film surface. The drawing conditions were selected so that the degree of orientation (ΔNx) of the film after the mono-axial drawing process can be set to 0.055. Those rolls having a coefficient of static friction between the roll and the film of 0.42 at 65° C. were used. Moreover, with respect to free rolls, special bearings were adopted to provide a rotary torque of 2.9 N, and with respect to the driving roll, the rotation marks were controlled to 0.008% or less. The surface on the edge side in the width direction of the film was pressed by a roller with a protrusion so as to form irregular portions in this section, and the film with the irregular portions was wound up into a roll shape by a winding mechanism. The protrusion in the above-mentioned roller with the protrusion was formed into a shape narrowed toward the top with the top of the protrusion forming a round shape so that the radius of the curvature of the top face is set to 0.3 mm, thus, it was possible to prevent the film from contacting defects on the surface of the roll at the time of the film winding process.

Example 5

Pellets of PET resin containing no particles with an intrinsic viscosity of 0.62 dl/g, which serve as a material of a base film, were vacuum-dried (1 Torr) for six hours at 135° C., and the resulting resin was then supplied to an extruder, and was extruded into a film shape in a melted state at approximately 280° C., and quickly cooled and solidified on a metal roll whose surface temperature was maintained at 20° C., thereby obtaining a cast film having a thickness of 1400 μm. During the melted state, this was subjected to a precision-filtering process by using a sintered filtering member made of stainless having a filtering particle size (initial filtering efficiency 95%) of 15 μm as a foreign-matter removing filtering member for the melted resin. The application liquid for forming the adhesive property modifying resin layer, used in Example 1, was applied to one surface of the above-mentioned cast film so as to set the final amount of application at the time of the film manufacturing process was set to 0.20 g/m².

After the application, this was dried at 105° C. for 30 seconds in a pre-heating zone, and was further heated at 100° C. for 45 seconds in a simultaneous biaxial orientation device, and drawn 3.6 times in the longitudinal direction and 4.1 times in the lateral direction, biaxially at the same time. Next, this was subjected to a thermal fixing process at 220° C., and further subjected to a slackening process of 5% in the width direction and 3.8% in the longitudinal direction, thereby obtaining an optical coating film made from a biaxial oriented PET film with a thickness of 125 μm having an adhesive property modifying resin layer on one surface thereof. The results obtained are shown in Table 1.

Example 6

An optical coating film was obtained by using the same method as Example 1, except for the following points. The results obtained are shown in Table 1.

With respect to the material of a base film, pellets of PEN resin containing no particles with an intrinsic viscosity of 0.65 dl/g were used, and the extrusion temperature was changed to 300° C., the longitudinal drawing temperature was changed to 145° C., the lateral drawing temperature was changed to 160° C. and the thermal fixing temperature was changed to 260° C.

Example 7

An optical coating film was obtained by using the same method as Example 1, except for the following points. The results obtained are shown in Table 1.

During the extrusion process, the highest temperature was set to 270° C. and the average residence time was set to 3.5 minutes; thus, the generation of oligomer in the PET was suppressed. The amount of oligomer deposited on the surface of the film after the film formation was 110 ppm. On the other hand, with respect to all the rolls used in the film manufacturing process, neither the above-mentioned rolls whose surface roughness Ra was maintained at 0.1 μm or less were used, nor the roll cleaners were placed. Moreover, the roll diameter used in the longitudinal drawing process was set to 300 mm, and none of the contacting devices such as suction rolls, electrostatic contact and a part nipping device were used. On the other hand, up to the final roll in the pre-heating process prior to the longitudinal drawing, a water film was formed on each roll so as to provide an arrangement that prevents the roll surface from directly contacting the film surface. Moreover, in the cooling process after the longitudinal drawing, the film was dipped into a water vessel immediately after the longitudinal drawing process so as to be cooled, and the temperature change on the succeeding rolls was set to 9° C. at maximum.

Comparative Example 1

A biaxial oriented coating PET film was obtained by using the same method as Example 1, except for the following points. The results obtained are shown in Table 1.

With respect to all the rolls used in the film manufacturing process, neither the above-mentioned rolls whose surface roughness Ra was maintained at 0.1 μm or less were used, nor the roll cleaners were placed. Furthermore, the roll diameter used in the longitudinal drawing process was set to 300 mm, and none of the contacting devices such as suction rolls, electrostatic contact and a part nipping device were used.

Comparative Example 2

A biaxial oriented coating PET film was obtained by using the same method as Example 2, except for the following points. The results obtained are shown in Table 1.

The degree of cleanliness in the film manufacturing process was set to class 5000, and no grinding process for removing defects on the surface of the roll by using an abrasive material for the roll was carried out prior to the film manufacturing process. Furthermore, the temperature change of the film on the roll was set to 50° C. at maximum, and the number of the rolls was set to 8 in the longitudinal drawing process.

Comparative Example 3

A biaxial oriented coating PET film was obtained by using the same method as Example 3, except for the following points. The results obtained are shown in Table 1.

The speeds of the preheating rolls prior to the longitudinal drawing process were set so that a draft of 3.5% was exerted with respect to 5 rolls as a whole. Furthermore, the film temperature at the outlet in the coating process was set to 63° C., and the speed of the driving roll was set so as to provide a tension of 4.9 MPa at the time of traveling.

Comparative Example 4

Pellets of PET resin containing no particles having an intrinsic viscosity of 0.65 dg/l with a moisture content of 30 ppm were melted and extruded at 250° C., and after having been formed into a film on cooling rolls at the surface temperature of 40° C., this was drawn 2.8 times in the length direction at 93° C. to form a mono-axial oriented PET film. On one surface of this was applied and dried a water soluble polyester copolymer resin with 0.02 mass % of a surfactant (PLUSCOAT RY-2, made by GOO CHEMICAL CO., LTD.) being added thereto.

Next, this was drawn three times in the width direction at 115° C., and the film, which had come out from the tenter, was evenly drawn between tension cut rolls constituted by a hard chrome plated roll having a draw of 1.015 with respect to the clip of the width-direction drawer and a nip roll made of silicone rubber, and then allowed to pass through five hard chrome plated rolls and wound by a winder to obtain a biaxial oriented coating PET film having a thickness of 188 $\mu$m. Here, the surface of the coating layer was washed with ethyl alcohol so that the surface active agent was measured to be 0.001 g/10 m$^2$. The present comparative example 4 is an experimental example corresponding to Example 1 of Japanese Unexamined Patent Application No. 9-183201 (1997). The results obtained are shown in Table 1.

Example 8

[Preparation of PET Resin for Base Film]

An esterification reaction container was heated, and at the time of reaching 200° C., slurry made from 86.4 parts by mass of terephthalic acid and 64.4 parts by mass of ethylene glycol was loaded therein, and to this were added 0.017 parts by mass of antimony trioxide and 0.16 parts by mass of triethyl amine as catalysts. Then, this was heated, and subjected to an esterification reaction under pressure under the conditions of 0.34 MPa at gauge pressure at 240° C.

Thereafter, the esterification reaction container was returned to normal pressure, and to this were added 0.071 parts by mass of magnesium acetate 4-hydrate and then 0.014 parts by mass of trimethyl phosphate. This was heated to 260° C. in 15 minutes, and to this were further added 0.12 parts by mass of trimethyl phosphate and then 0.0036 parts by mass of sodium acetate. The resulting esterification reaction product was transported to a polycondensation reaction container, and gradually heated from 260° C. to 280° C. under a reduced pressure so that this was subjected to a polycondensation reaction at 285° C. After completion of the polycondensation reaction, this was filtered through a filter made from nylon (initial filtering efficiency: 95%) having a pore diameter of 5 $\mu$m.

Next, the PET resin, which was the above-mentioned polycondensation reaction product, was formed into pellets in a closed chamber in which foreign matters with a diameter of 1 $\mu$m or more existing in air had been reduced by using a HEPA filter. The pellet forming process was carried out by a method in which, while pouring cooling water that had been preliminarily filtered (pore diameter: 1 $\mu$m or less), molten PET resin was extruded from a nozzle of an extruder into a cooling water vessel, and the resulting PET resin in a strand shape was cut. The resulting pellets of the PET resin had an intrinsic viscosity of 0.62 dl/g, an Sb content of 144 ppm, an Mg content of 58 ppm, a P content of 40 ppm, a color L-value of 56.2, a color b-value of 1.6 and a melt specific resistivity of $0.23 \times 10^8$ $\Omega$·cm at 275° C., and contained virtually neither inert particles nor inner deposited particles.

[Preparation of Coating Film]

After the above-mentioned PET resin pellets for base film had been dried for 6 hours under a reduced pressure (133 Pa) at 135° C., this was supplied to an extruder, and melted and extruded into a sheet shape at approximately 280° C., quickly cooled on metal rolls whose surface temperature was maintained at 20° C., and adhered and solidified to each other while applying static electricity to prepare a cast film having a thickness of 1400 $\mu$m. In this case, the molten PET resin was precision-filtered by using a sintered filtering member made of stainless steel having a filtering particle size of 15 $\mu$m (initial filtering efficiency: 95%) as a foreign matter removing filtering member.

This cast film was heated to 100° C. by a group of heated rolls and an infrared heater, and then drawn 3.5 times in the length direction by using a group of rolls having differences in peripheral velocity to prepare a mono-axial oriented PET film.

Here, in the entire processes, the surface roughness Ra of the rolls was maintained at 0.1 $\mu$m or less, and roll cleaners were placed at the preheating inlet and the cooling roll in the longitudinal drawing process. The roll diameter of the longitudinal drawing process was set to 150 mm, and the film was made in closely contact with the rolls by using contacting devices such as a suction roll, electrostatic contact and a part nipping device.

Here, with respect to an application liquid for an adhesive property modifying resin layer, to a mixed solvent composed of 60 mass % of water and 40% mass of isopropyl alcohol was added a copolymer polyester resin dispersing solution (MD-1200 made by Toyo Boseki Kabushiki Kaisha) so as to form 4 parts by mass with respect to the total amount 100 parts by mass of the mixed solvent and the resin dispersing solution, and to this was further added colloidal silica (Snowtechs OL made by Nissan Chemical Industries, Ltd., average SEM particle size: 40 nm) so as to form 5 parts by mass with respect to the total amount 100 parts by mass of the solid components, and these were mixed and dispersed.

The resulting application liquid was precision-filtered by using a filtering member made of felt-type polypropylene having a filtering particle size (initial filtering efficiency: 95%) of 25 μm, and applied and dried onto one surface of the above-mentioned PET film by using a reverse roll method. The amount of application at this time was 0.20 g/m². After the application, this was directed to a hot-air zone heated to 130° C. with the end of the film being held by a clip, and after having been dried, this was drawn 4.0 times in the width direction to obtain a film with a thickness of 100 μm. Furthermore, a center portion corresponding to 1.5 m of the entire width was trimmed to prepare an optical coating film. The adhesive property between the acrylic hard coating layer and the coating layer face of the coating film was 15%, and the wet endurance contacting property was 0%. The other results obtained are shown in Table 1.

Example 9

The same processes as Example 8 were carried out to obtain an optical coating film, except that the application liquid for the adhesive property modifying resin layer was altered to the following application liquid. Although the adhesive property between the acrylic hard coating layer and the coating layer face of the resulting film was 100%, which was superior, the wet endurance contacting property was 40%, which was insufficient. The other results obtained are shown in Table 1.

To a reaction container were loaded 95 parts by mass of dimethyl terephthalate, 95 parts by mass of dimethyl isophthalate, 35 parts by mass of ethylene glycol, 145 parts by weight of neopentyl glycol, 0.1 parts by mass of zinc acetate and 0.1 parts by mass of antimony trioxide, and this was subjected to an ester exchanging reaction in three hours at 180° C.

Next, to this was added 6.0 parts by mass of 5-sodium sulfoisophthalic acid so that an esterification reaction was carried out in one hour at 240° C., and this was then subjected to a polycondensation reaction in two hours at 250° C. under a reduced pressure (13.3 to 0.26 hPa) to obtain a copolymer polyester resin (A) having a molecular weight of 19500 and a softening point of 60° C.

A water dispersing solution of 30 mass % of the resulting copolymer polyester resin (6.7 parts by mass), 40 parts by mass of a water solution of 20 mass % of a self-crosslinking type polyurethane resin (B) containing an isocyanate group blocked by sodium bisulfite (ELASTRON H-3, made by Dai-ichi Kogyo Seiyaku Co., Ltd.), 0.5 parts by mass of an elastron-use catalyst (Cat64, made by Dai-ichi Kogyo Seiyaku Co., Ltd.), 44.3 parts by mass of water and 5 parts by mass of isopropyl alcohol were respectively mixed together, and to this were further added 0.6 mass % of a water solution of 10 mass % of an anionic surfactant, 1.8 parts by mass of a water dispersing solution of 20 mass % of particles A (Snowtechs OL made by Nissan Chemical Industries, Ltd., average SEM particle size: 40 nm) and 1.1 parts by mass of 4% water dispersing solution of particles B (Aerosil 50 made by Japan Aerosil Inc. average SEM particle size: 200 nm) to form an application liquid.

Example 10

The same processes as Example 8 were carried out to obtain an optical coating film, except that the application liquid for the adhesive property modifying resin layer was altered to the following application liquid. Both of the adhesive property of the coating layer face of the resulting film and the wet endurance contacting property were 100%, which were superior. The other results obtained are shown in Table 1.

(1) Preparation of Copolymer Polyester Resin

To an autoclave made of stainless steel, provided with a stirrer, a thermometer and a partially reflux-type condenser were added 163 parts by mass of dimethylterephthalate, 163 parts by mass of dimethylisophthalate, 169 parts by mass of 1,4-butane diol, 324 parts by mass of ethylene glycol and 0.5 parts by mass of tetra-n-butyltitanate, and this was subjected to an ester exchanging reaction in four hours from 160° C. to 220° C.

Next, to this were further added 14 parts by mass of fumaric acid and 203 parts by mass of sebacic acid, and this was heated from 200° C. to 220° C. in one hour to carry out an esterification reaction. This was then heated to 255° C., and after the reaction system was gradually reduced in pressure, and this was allowed to react for one and half hours under a reduced pressure of 29 Pa to obtain a copolymer polyester resin. The resulting copolymer polyester resin was transparent with a thin yellow color.

(2) Preparation of Graft Resin

To a reaction container provided with a stirrer, a thermometer, a quantitative dropping device and a reflux condenser were added 75 parts by mass of copolymer polyester resin, 56 parts by mass of methylethylketone and 19 parts by mass of isopropyl alcohol, and this was heated and stirred at 65° C. so that the resin was dissolved. After the resin had been completely dissolved, 15 parts by mass of maleic anhydride was added to the polyester solution.

Next, a solution, prepared by dissolving 10 parts by mass of styrene and 1.5 parts by mass of azobisdimethyl valeronitrile in 12 parts by mass of methylethylketone, was dropped in the polyester solution at a rate of 0.1 ml/min, and this was further stirred for two hours. After the reaction solution had been sampled for analysis, 5 parts by mass of methanol was added thereto. Next, 300 parts by mass of water and 15 parts by mass of triethylamine were added to the reaction solution, and stirred for one hour.

Thereafter, the inner temperature of the reaction container was raised to 100° C. so that methylethylketone, isopropyl alcohol and excessive triethylamine were removed through distillation, thereby obtaining water dispersing graft polymerization resin. The water dispersing graft resin was transparent with a thin yellow color. The acid value of this graft material was 1400 eq/t.

(2) Adjustment of Application Liquid

Water dispersing solution of 25 mass % of the resulting water dispersing graft resin (40 parts by mass), 24 parts by mass of water and 36 parts by mass of isopropyl alcohol were respectively mixed, and to this application liquid were added 1 mass % of propionic acid and anionic surfactant respectively, and to this was further added a water dispersing solution of colloidal silica fine particles (Snowtechs OL made by Nissan Chemical Industries, Ltd., average SEM particle size: 40 nm) as silica that accounts for 5 mass % to the resin solid component, thus, an application liquid was prepared.

TABLE 1

| | Number of scratches (pcs/m²) | | | Haze (%) | Thickness (μm) | Base film |
|---|---|---|---|---|---|---|
| | Longitudinal direction | Lateral direction | Total | | | |
| Example 1 | 2 | 4 | 6 | 0.9 | 100 | PET |
| Example 2 | 3 | 3 | 6 | 0.9 | 125 | PET |
| Example 3 | 5 | 3 | 8 | 1.0 | 188 | PET |
| Example 4 | 19 | 7 | 26 | 0.9 | 125 | PET |
| Example 5 | 24 | 3 | 27 | 0.9 | 125 | PET |
| Example 6 | 12 | 3 | 15 | 0.9 | 100 | PEN |
| Example 7 | 12 | 14 | 26 | 0.9 | 100 | PET |
| Comparative Example 1 | 83 | 102 | 185 | 1.0 | 100 | PET |
| Comparative Example 2 | 156 | 336 | 492 | 1.1 | 125 | PET |
| Comparative Example 3 | 130 | 203 | 333 | 1.2 | 188 | PET |
| Comparative Example 4 | 359 | 83 | 442 | 2.0 | 188 | PET |
| Comparative Example 8 | 2 | 5 | 7 | 0.8 | 100 | PET |
| Comparative Example 9 | 1 | 4 | 6 | 0.7 | 100 | PET |
| Comparative Example 10 | 1 | 5 | 7 | 0.5 | 100 | PET |

What is claimed is:

1. An optical coating film which uses a transparent biaxial oriented thermoplastic resin film having a thickness of 50 μm or more as a base film, and has an adhesive property modifying resin layer on at least one surface of said base film,
   wherein the number of scratches being 1 μm or more in depth and 3 mm or more in length on the surface of said coating film is 100 pcs/m² or less.

2. The optical coating film according to claim 1, wherein with respect to said scratches, the number of longitudinal direction scratches is 50 pcs/m² or less, and the longitudinal scratches are referred to scratches having a deviation of ±45° or less from the longitudinal direction of said optical coating film in the longest direction.

3. The optical coating film according to claim 1, wherein with respect to said scratches, the number of lateral direction scratches is 50 pcs/m² or less, and the lateral direction scratches are referred to scratches having a deviation of less than ±45° from the width direction of said optical coating film in the longest direction.

4. The optical coating film according to claim 1, wherein the number of said scratches is 30 pcs/m² or less.

5. The optical coating film according to claim 1, wherein the number of said scratches is 10 pcs/m² or less.

6. The optical coating film according to claim 1, wherein with respect to said optical coating film, a haze value is 1.0% or less.

7. The optical coating film according to claim 1, wherein with respect to said optical coating film, no particles are substantially contained in the base film, and particles having an average particle size of 0.005 to 1.0 μm are contained in an adhesive property modifying resin layer at 0.1 to 60 mass %.

8. The optical coating film according to claim 7, wherein with respect to said optical coating film, the particles to be contained in the adhesive property modifying resin layer are silica.

9. The optical coating film according to claim 1, wherein with respect to said optical coating film, the base film is made from polyester, said polyester contains a magnesium compound of 40 to 70 ppm calculated on a magnesium atom and a phosphor compound of 10 to 55 ppm calculated on a phosphorus atom, and a melt specific resistivity of said polyester is 0.10 to 0.45×10⁸ Ω·cm.

10. The optical coating film according to claim 1, wherein with respect to said optical coating film, the base film is polyester mainly composed of polyethyleneterephthalate and/or polyethylene-2,6-naphthalate.

11. The optical coating film according to claim 1, wherein with respect to said optical coating film, the adhesive property modifying resin layer is mainly composed of at least one kind selected from a copolymer polyester resin, a polyurethane resin and an acrylic resin.

* * * * *

UNITED STATES PATENT AND TRADEMARK OFFICE
CERTIFICATE OF CORRECTION

PATENT NO.    : 6,649,260 B2
DATED         : November 18, 2003
INVENTOR(S)   : Katsufumi Kumano, Naonobu Oda and Akira Ito It is certified that error appears in the above-identified patent and that said Letters Patent is hereby corrected as shown below:

Column 3,
Line 39, delete "≠cm" and insert -- Ω cm --.

Signed and Sealed this

Twenty-second Day of June, 2004

JON W. DUDAS
*Acting Director of the United States Patent and Trademark Office*